United States Patent
Niwa et al.

(10) Patent No.: US 10,648,435 B2
(45) Date of Patent: May 12, 2020

(54) FUEL SUPPLY DEVICES

(71) Applicant: AISAN KOGYO KABUSHIKI KAISHA, Obu-shi, Aichi-ken (JP)

(72) Inventors: Kensuke Niwa, Nagoya (JP); Koji Yoshida, Kasugai (JP); Takayuki Usui, Aichi-ken (JP); Yuichi Murakoshi, Inazawa (JP); Yoshiki Kamio, Nagoya (JP)

(73) Assignee: AISAN KOGYO KABUSHIKI KAISHA, Obu-Shi, Aichi-ken (JP)

( * ) Notice: Subject to any disclaimer, the term of this patent is extended or adjusted under 35 U.S.C. 154(b) by 186 days.

(21) Appl. No.: 15/521,729

(22) PCT Filed: Oct. 8, 2015

(86) PCT No.: PCT/JP2015/078646
§ 371 (c)(1),
(2) Date: Apr. 25, 2017

(87) PCT Pub. No.: WO2016/072210
PCT Pub. Date: May 12, 2016

(65) Prior Publication Data
US 2017/0248105 A1    Aug. 31, 2017

(30) Foreign Application Priority Data
Nov. 4, 2014 (JP) ................. 2014-224092

(51) Int. Cl.
*F02M 37/10* (2006.01)
*F04D 3/00* (2006.01)
(Continued)

(52) U.S. Cl.
CPC ............ *F02M 37/10* (2013.01); *F02M 37/08* (2013.01); *F02M 37/103* (2013.01); *F04D 3/005* (2013.01);
(Continued)

(58) Field of Classification Search
CPC ...... F02M 37/10; F02M 37/103; F02M 37/08; F16F 1/027; F04D 3/005; F04D 29/181; H02K 5/225; H02K 7/14
See application file for complete search history.

(56) References Cited

U.S. PATENT DOCUMENTS 5,038,741 A * 8/1991 Tuckey ............... F02M 37/103
123/497
5,875,816 A * 3/1999 Frank ................. B01D 35/0273
137/549

(Continued)

FOREIGN PATENT DOCUMENTS

JP        S51-126821 U    10/1976
JP        2000-240723 A    9/2000
(Continued)

OTHER PUBLICATIONS

International Patent Application No. PCT/JP2015/078646 International Search Report dated Dec. 15, 2015 (5 pages).
(Continued)

*Primary Examiner* — Syed O Hasan
(74) *Attorney, Agent, or Firm* — Conley Rose, P.C.

(57) ABSTRACT

A fuel supply device includes a pump unit with a fuel pump that has a rotary body rotating about a rotary shaft and a load receiving portion, configured to receive the load of the pump unit. A connecting portion is provided for connecting the pump unit to the load receiving portion such that the pump unit is suspended by the load receiving portion. The connecting portion is disposed so as to extend across a virtual plane which is perpendicular to the rotary shaft for the rotary body of the fuel pump and passes through the center of gravity of the pump unit.

8 Claims, 9 Drawing Sheets

(51) Int. Cl.
*F02M 37/08* (2006.01)
*F16F 1/02* (2006.01)
*H02K 5/22* (2006.01)
*F04D 29/18* (2006.01)

(52) U.S. Cl.
CPC ............ *F04D 29/181* (2013.01); *F16F 1/027* (2013.01); *H02K 5/225* (2013.01)

(56) References Cited

U.S. PATENT DOCUMENTS

| | | | |
|---|---|---|---|
| 6,216,734 B1* | 4/2001 | Umetsu | F02M 37/103 123/509 |
| 7,056,102 B2* | 6/2006 | Cremer | B60K 15/077 417/363 |
| 8,992,190 B2* | 3/2015 | Okazono | F02M 37/103 137/565.17 |
| 2008/0078918 A1* | 4/2008 | Fujiwara | F16F 15/06 248/560 |
| 2008/0216801 A1 | 9/2008 | Kanamaru et al. | |
| 2016/0333833 A1* | 11/2016 | Honda | F02M 37/10 |

FOREIGN PATENT DOCUMENTS

| | | |
|---|---|---|
| JP | 2001-082274 A | 3/2001 |
| JP | 2004-204847 A | 7/2004 |
| JP | 2008-088814 A | 4/2008 |
| JP | 2008-215306 A | 9/2008 |
| JP | 2009-127471 A | 6/2009 |
| JP | 2012-184760 A | 9/2012 |

OTHER PUBLICATIONS

Japanese Office Action dated Nov. 7, 2017, for Japanese Application No. 2014-224092 (5 p.).
English Translation of Japanese Office Action dated Nov. 7, 2017, for Japanese Application No. 2014-224092 (5 p.).

* cited by examiner

FUEL SUPPLY DEVICES

CROSS-REFERENCE TO RELATED APPLICATIONS

The present application is a National Phase entry of, and claims priority to, PCT Application No. PCT/JP2015/078646, filed Oct. 8, 2015, which claims priority to Japanese Patent Application No. 2014-224092, filed Nov. 4, 2014, both of which are incorporated by reference herein in their entireties for all purposes.

STATEMENT REGARDING FEDERALLY SPONSORED RESEARCH OR DEVELOPMENT

Not applicable.

BACKGROUND

The present disclosure relates to a fuel supply device for supplying fuel from within a fuel tank to an internal combustion engine wherein the fuel tank is mounted to a vehicle, e.g. an automobile. In particular, the present disclosure relates to a holding structure of a fuel pump used for a fuel supply device.

Fuel supply devices for supplying fuel to an internal combustion engine and fuel supply devices attached to a fuel tank are conventionally known in the art. Japanese Laid-Open Patent Publication No. 2008-88814 discloses a prior art device for damping vibrations caused by a fuel pump provided in a fuel supply device. This prior art may prevent a generation of noise that is caused by the vibrations of the fuel tank. This prior art is provided with contact portions that limit the amount of deformation of a support portion to within a predetermined amount, wherein the support portion supports a case for accommodating a pump. This configuration may damp the vibrations of the fuel pump while preventing breakage due to impact force. However, the prior art disclosed in the above publication can still be further improved. For example, in the above publication, the relationship between the transmission of the vibrations and the motion of the pump unit are not considered.

BRIEF SUMMARY

Figure 12:
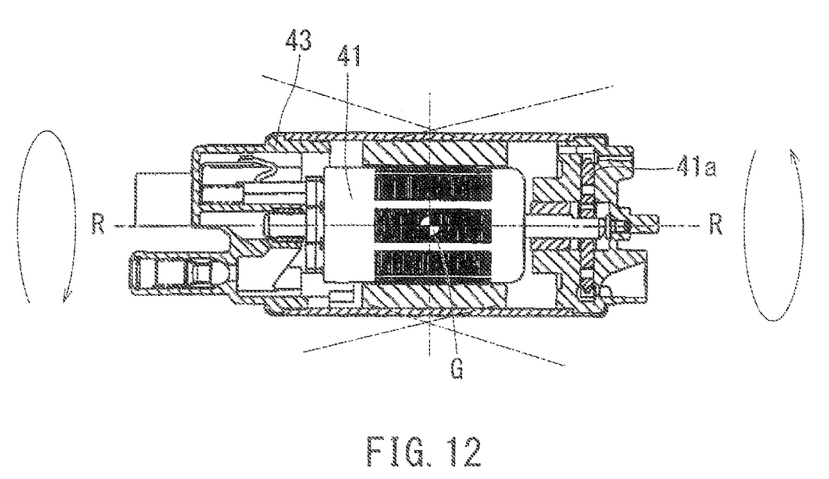
FIG. 12 is a drawing illustrating the motion of the fuel pump when a rotary body within the fuel pump is rotated.

The present inventors have noticed that when the fuel pump is operated, the motion of the pump unit is not entirely vibrating motion, but the pump unit also moves such that both ends of the pump unit move in a circular fashion about the longitudinal axis in the vicinity of the center of gravity of the pump unit (see FIG. 12). They also noticed that the amplitude of the vibrations at portions where the load of the pump unit is applied may depend on a position where the pump unit is supported. Therefore, in light of the above, the present inventors have anticipated that the vibrations transmitted to a fuel tank etc. may be reduced if the pump unit is supported in a suspended manner in view of the motion of the pump unit.

According to one aspect of the present disclosure, a fuel supply device comprises a pump unit with a fuel pump that has a rotary body rotating about a rotary shaft and a load receiving portion configured to receive load of the pump unit. A connecting portion is provided for connecting the pump unit to the load receiving portion such that the pump unit is suspended to the load receiving portion. The connecting portion is disposed so as to extend across a virtual plane which is perpendicular to the rotary shaft for the rotary body of the fuel pump and where the plane also passes through the center of gravity of the pump unit.

The amplitude of vibrations (vibration length) may be relatively small in the vicinity of the center of gravity of the pump unit when the pump unit vibrates as it is driven. The pump unit is suspended to the load receiving portion by the connecting portion which is positioned in the vicinity of the center of gravity. Therefore, the vibrations transmitted from the pump unit to the load receiving portion are relatively small. Further, since the pump unit is configured to be suspended to the load receiving portion, the flexibility in configuration of the connecting portion can be increased without need of increasing rigidity of the connecting portion.

According to another aspect of the present disclosure, the load receiving portion may be made of elastic material. Therefore, the vibrations from the pump unit may be absorbed by the load receiving portion through elastic deformation. Consequently, the vibrations transmitted from the pump unit to the fuel tank may be reduced.

According to another aspect of the present disclosure, the load receiving portion may have an arc shape as seen from a side view. Therefore, the load receiving portion may have a configuration that can easily support the load of the pump unit. Further, the load receiving portion may easily be placed along an outer configuration of the fuel pump. Doing so may reduce unevenness of the fuel supply device wherein the unevenness is formed by the load receiving portion. Accordingly, through change in configuration, the load receiving portion may be prevented from becoming an obstacle when the fuel supply device is inserted from an opening formed in the fuel tank.

According to another aspect of the present disclosure, the load receiving portion may have an S-shaped portion. Therefore, the load receiving portion may be longer than that of the configuration without an S-shaped portion so that with the S-shaped portion configuration a vibration transmission path can be made relatively long. Consequently, the vibrations transmitted via the load receiving portion to the fuel tank etc. may be reduced. Further, the load receiving portion may also have an elastically deformable configuration due to the S-shaped portion. Accordingly, the vibrations from the pump unit to the fuel tank can be effectively damped.

According to another aspect of the present disclosure, both ends of the load receiving portion may engage with a base portion by a connecting structure where a protruding portion is inserted into a recessed portion. Therefore, the recessed portion and the protruding portion may easily be rattled because of the gap formed between them, and this rattling may dampen the vibrations from the pump unit.

DETAILED DESCRIPTION

Figure 1:
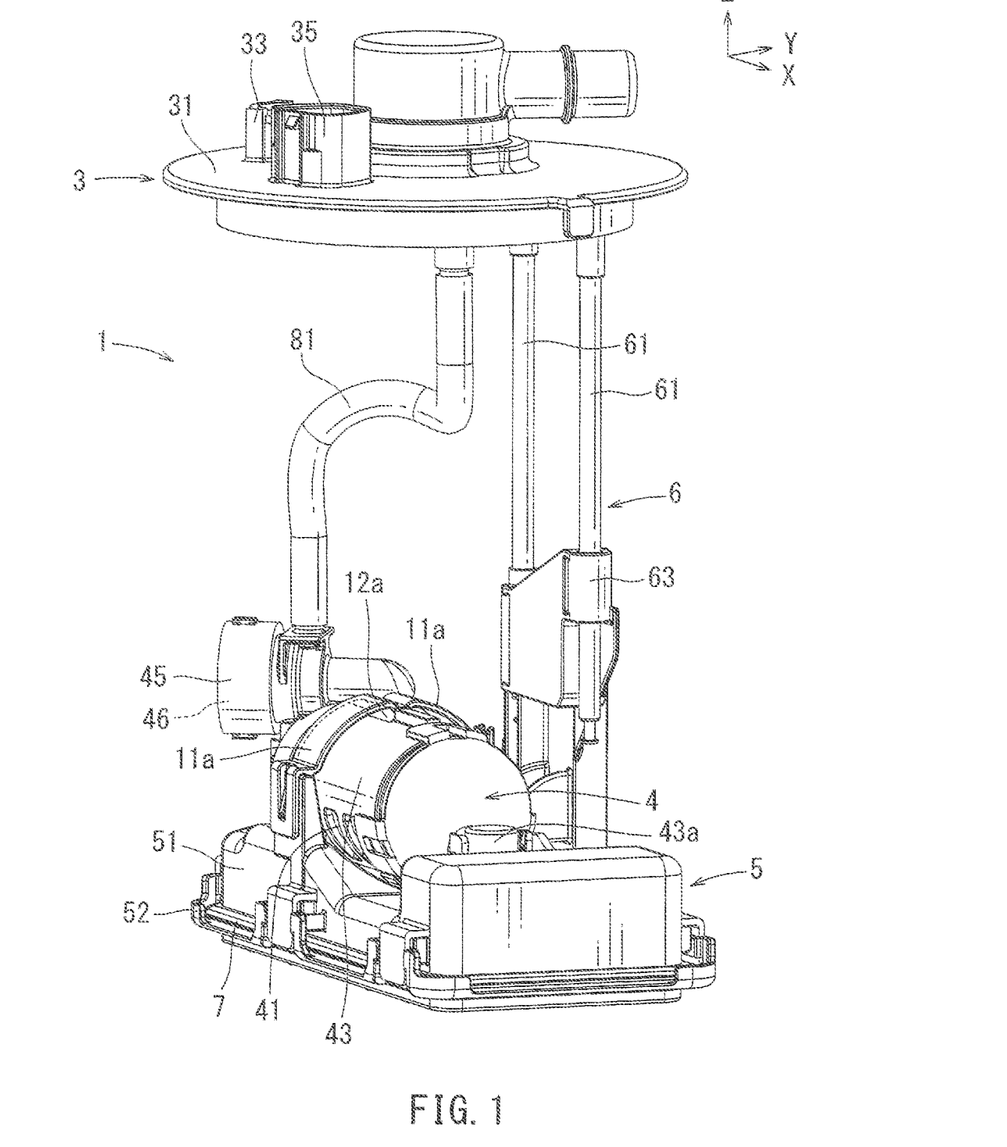
FIG. 1 is a perspective view of a fuel supply device.

One embodiment of the present disclosure will now be described with reference to the drawings. The forward and backward directions, upward and downward directions as well as leftward and rightward directions in the present specification are determined such that X is a forward direction, Y is a leftward direction and Z is an upward direction as shown in FIG. 1, where the backwards, leftwards, and downwards directions extend in the negative direction of X, Y, and Z, respectively. A cover member 3 of a fuel supply device 1 is usually positioned at an upper direction relative to a pump unit 4, which is positioned at a downward position relative to the cover member 3. In the following description, the directions are referred to with the assumption that the fuel supply device 1 is attached to the fuel tank 9 as shown in FIG. 2 unless otherwise specifically noted.

A fuel supply device 1 according to the present embodiment may be mounted on a vehicle, and particularly, for example, on an automobile. The fuel supply device 1 is attached to a fuel tank 9 arranged below a floor of the vehicle. The fuel supply device 1 is used to feed liquid fuel stored within the fuel tank 9 into an internal combustion engine (not shown).

Figure 2:
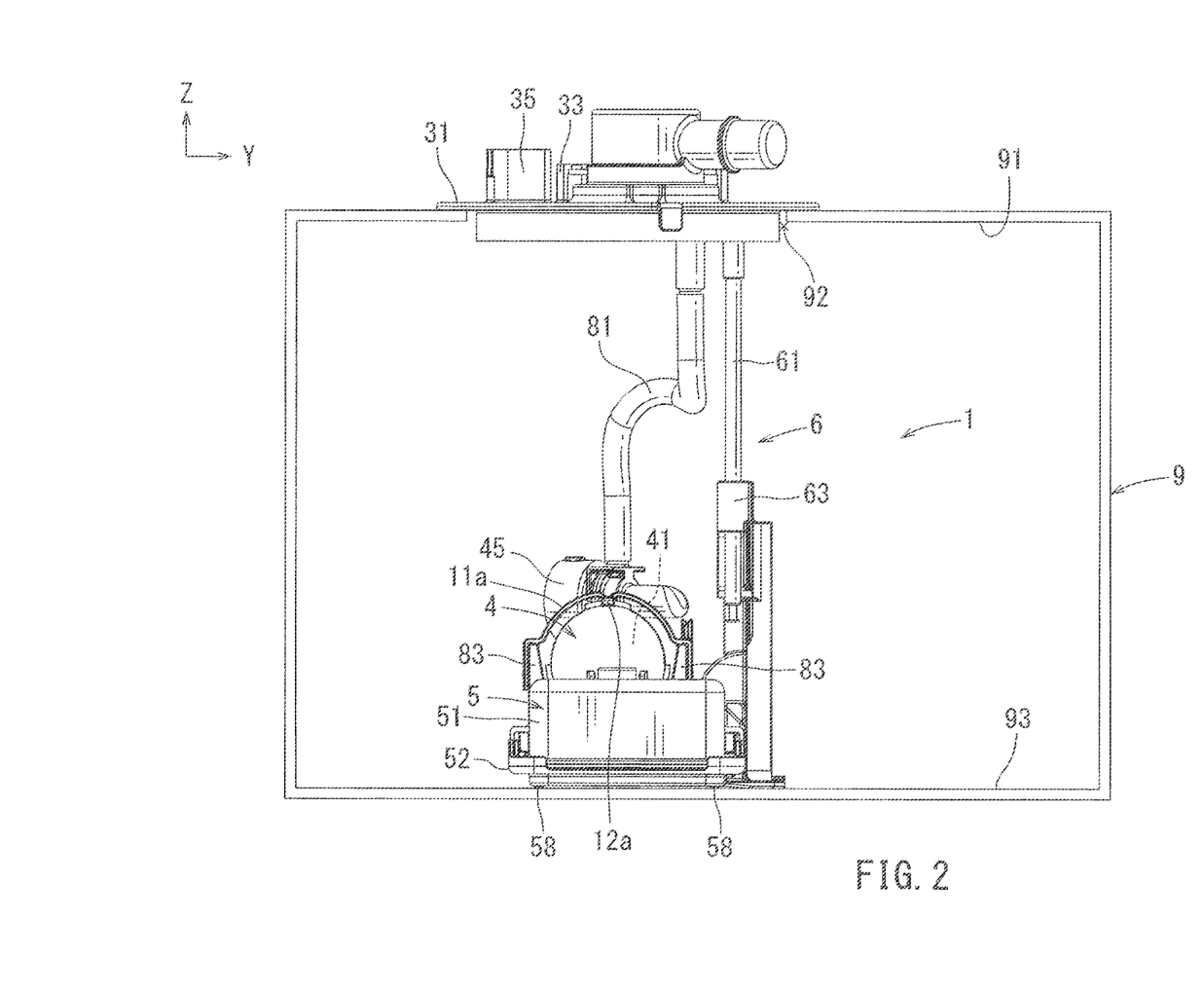
FIG. 2 is a cross sectional view of a fuel tank when the fuel supply device is attached to the fuel tank, and a front view of the fuel supply device.

As shown in FIGS. 1 and 2, the fuel supply device 1 includes a cover member 3 attached to an opening section 92 formed in an upper portion 91 of the fuel tank 9 and a pump unit 4 having a pump 41 for delivering fuel within the fuel tank 9 to the outside. The fuel supply device further includes a base portion 5 capable of abutting a bottom surface 93 of the fuel tank 9, and a connecting member 6 for connecting the cover member 3 and the base portion 5. The opening section 92 of the fuel tank 9 can be closed while the base portion 5 may abut the bottom surface 93 of the fuel tank 9 if the cover member 3 is attached to the opening section 92 of the fuel tank 9 (see FIG. 2).

As shown in FIGS. 1 and 2, the cover member 3 includes a set plate portion 31 which may cover the opening section 92 of the fuel tank 9. The substantially disk-shaped set plate portion 31 includes an outlet port 33 for leading fuel delivered from the pump unit 4 to the outside of the fuel tank 9. Further, the set plate portion 31 also includes an electric connector 35 for connecting electric wiring. The opening section 92 normally has a circular shape, and the set plate portion 31 has a substantially circular shape in plan view, which is concentric with and thus corresponds to the shape of the opening section 92. A ring (not shown) made of resin as a seal member e.g. an O-ring is attached to the opening section 92 to prevent a gap from being formed between the fuel tank 9 and the cover member 3.

As shown in FIGS. 1 and 2, the connecting member 6 is telescopic, and is configured to be extendable and retractable. The connecting member 6 includes a rod member 61 attached to the cover member 3 and a joint portion 63 which is movable along the rod member 61. The rod member 61 extends in a direction orthogonal to the plane in which the set plate portion 31 extends radially. A spring member (not shown) that can exert elastic force is arranged between the joint portion 63 and the cover member 3. The spring member biases the cover member 3 to move away from the pump unit 4 whenever the cover member 3 and the pump unit 4 mutually approach closer than a predetermined distance. In this manner, the spring member is compressed while the cover member 3 is moved towards the bottom surface 93 of the fuel tank 9 from a state in which the bottom surface of the pump unit 4 abuts and contacts the bottom surface 93 of the fuel tank 9. As long as this compressed state of the spring member is maintained, the pressed state of the pump unit 4 against the bottom surface 93 of the fuel tank 9 will also be maintained.

Figure 4:
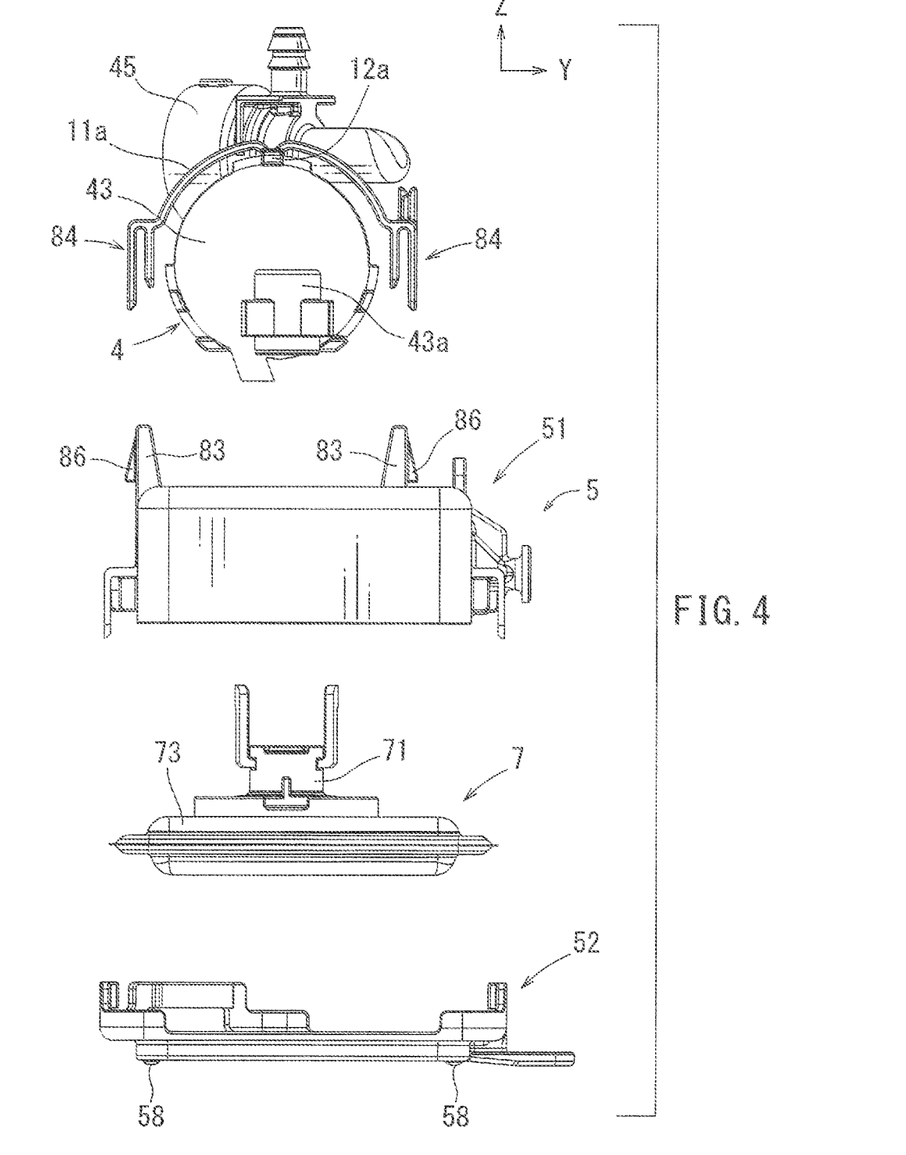
FIG. 4 is an exploded front view of a base portion of the fuel supply device.
Figure 5:
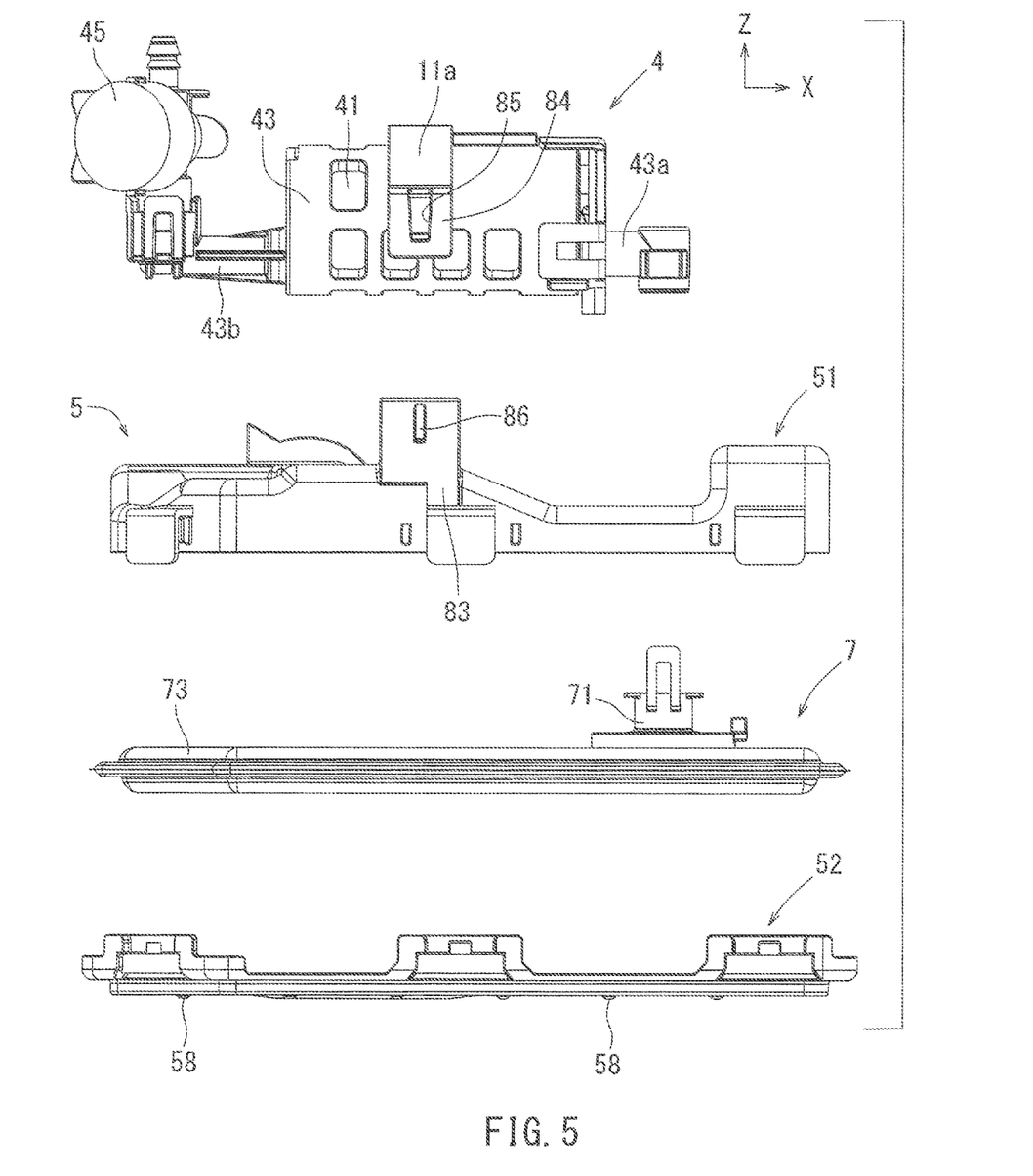
FIG. 5 is an exploded right side view of the base portion of the fuel supply device.

As shown in FIGS. 1 and 2, the pump unit 4 is arranged below the cover member 3. The pump unit 4 includes a pump 41 for delivering fuel, a substantially cylindrical pump casing 43 for covering the fuel pump 41, a pressure adjusting valve 46, and a case 45 for the pressure adjusting valve. By having this configuration, the pump unit 4 includes mainly the fuel pump 41 and portions which are not relatively movable with respect to the fuel pump 41. A filter member 7 with a filter medium 73 as shown in FIGS. 4 and 5, is connected to the pump unit 4. Further, as shown in FIGS. 1 and 2, a hose 81 which is relatively movable to the fuel pump 41, is also connected to the pump unit 4. Neither the filter member 7 nor the hose 81 are included in the pump unit 4.

Figure 3:
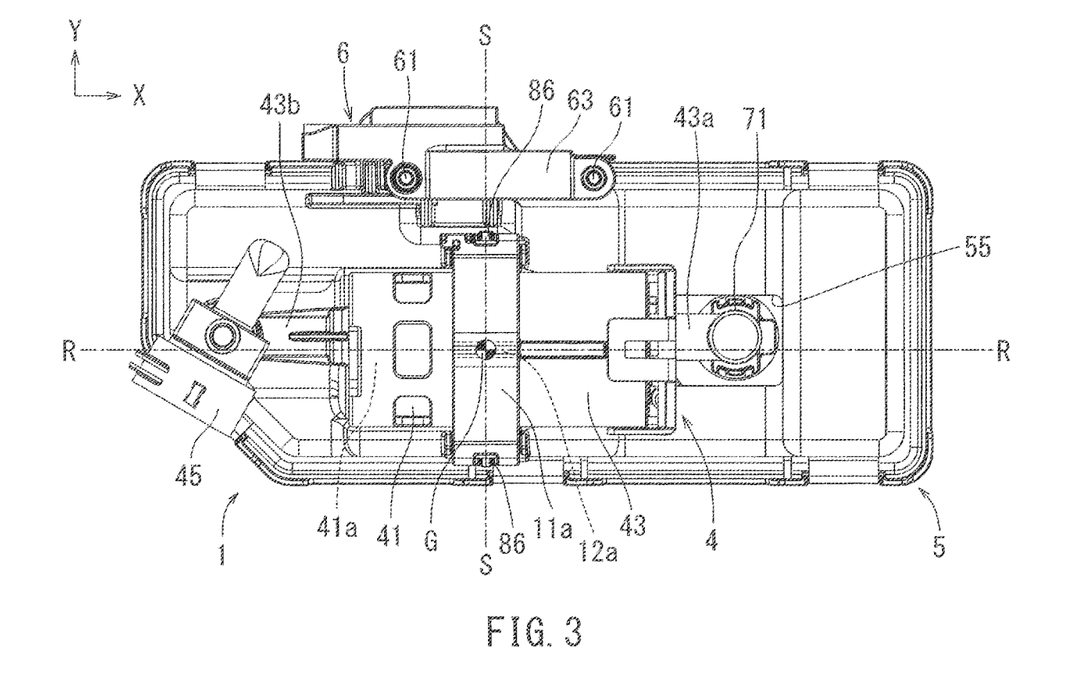
FIG. 3 is a plan view of a load receiving portion of the fuel supply device.

As shown in FIGS. 1 and 2, the pump unit 4 is positioned above the base portion 5. The base portion 5 is formed in a substantially flat plate shape and is arranged so that one of its surfaces faces the bottom surface 93 of the fuel tank 9. The base portion 5 may also be referred to as a fuel reservoir or a sub-tank etc. The base portion 5 is configured by assembling an upper base 51 positioned directly below the fuel pump 41, and a lower base 52 which contacts the bottom surface 93 of the fuel tank 9. As shown in FIGS. 4 and 5, the upper base 51 and the lower base 52 are assembled such that the filter medium is positioned between them. As shown in FIGS. 3 to 5, the pump unit 4 is provided with a suction port 43a so that the connection portion 71 formed on the filter member 7 is connected to the suction port 43a. Consequently, the fuel passed through the filter member 7 can be sucked by the pump 41. The connection portion 71 is inserted in an opening 55 of an upper base 51 and is disposed in a non-contacting manner relative to the opening 55. Further, the connection portion 71 is connected to the suction port 43a such that it has a relatively high freedom of movement.

A not-shown opening is provided at the bottom surface of the lower base 52. As shown in FIG. 2, the lower base 52 comprises leg portions 58 which provide clearance between the lower base 52 and the bottom surface of the tank 9 thus forming an opening such that fuel can be sucked from the opening even when the lower base 52 is abuts and contacts the bottom surface 93 of the fuel tank 9. As shown in FIGS. 4 and 5, the outer perimeter of the upper base 51 is slightly smaller than the outer perimeter of the lower base 52. Thus, a radial gap is formed between the upper base 51 and the lower base 52 along their respective outside perimeters when the filter medium 73 is not interleaved in between. The gap can serve to introduce fuel into the base portion 5. The filter medium 73 is arranged to cover the outer periphery of the bottom of the upper base 51 along the extent of the base's outer perimeter. This configuration allows the fuel that enters into the base portion 50 from the gap to reach the fuel pump 41 after passing through the filter medium 73. The filter medium 73 is formed by superimposing substantially rectangular non-woven fabrics and joining the peripheries. A frame (not-shown) is disposed between the non-woven fabrics to form a space inside between them.

Figure 7:
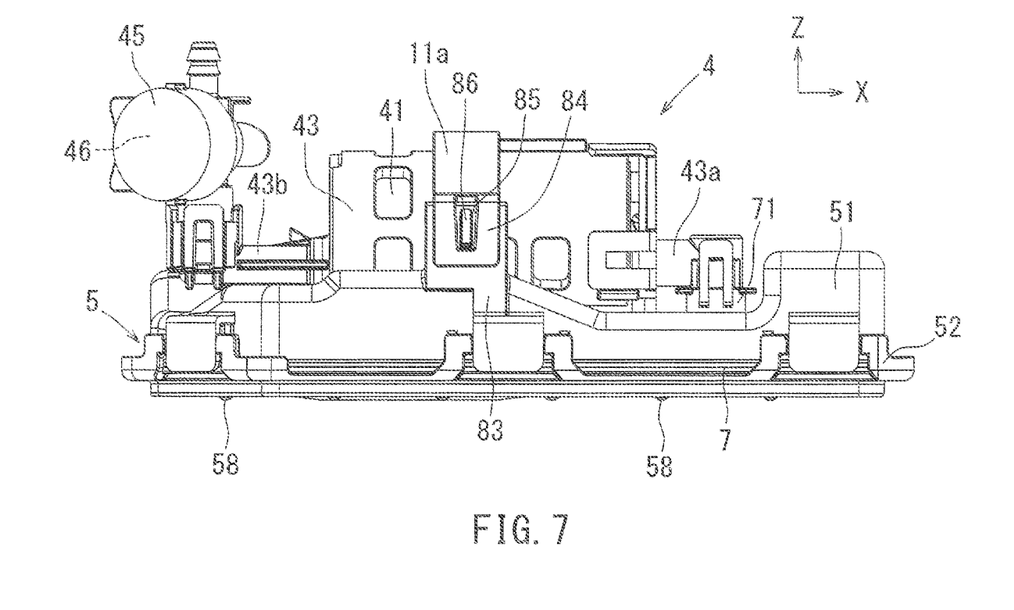
FIG. 7 is a right side view of the components shown in FIG. 5 in an assembled configuration.

As shown in FIG. 7, the fuel pressurized by the fuel pump 41 passes through the pressure adjusting valve 46 that serves to adjust the feed pressure of the fuel before the fuel reaches the internal combustion engine. For example the pressure adjusting valve 46 may be provided at the pump unit 4. More particularly, the pressure adjusting valve 46 is mounted to a valve supporting portion 43b extending from the pump casing 43 covering the fuel pump 41. The fuel after having its pressure adjusted by the pressure adjusting valve 46 is fed to the internal combustion engine through a hose 81 and a discharge port 33 shown in FIG. 1. The pressure adjusting valve 46 is covered with a case 45 for the pressure adjusting valve.

As shown in FIGS. 2 and 3, a load receiving portion 11a is connected to the base portion 5. A connecting portion 12a is provided between the load receiving portion 11a and the pump unit 4. The connecting portion 12a is positioned above the pump casing 43 and the pump unit 4 is suspended in relation to the connecting portion 12a so as to be structurally supported by the load receiving portion 11a. The load receiving portion 11a is configured such that its shape resembles a flat plate-like member as seen from a top view in the XY plane which has a semi-circular arc shape as seen from a side view in the ZY plane, with two flanges extending tangentially off of radially opposite ends of the semicircular arc. The load receiving portion 11a is arranged so that the connecting portion 12a extends directly downward from the uppermost portion of the circular arc.

As shown in FIG. 3, a length of the connecting portion 12a in the forward and backward directions has a substantially same length as the front-to rear width of the flat plate-like load receiving portion 11a as seen from a top view in the XY plane. More specifically, the connecting portion 12a is arranged such that it spans the entire width of the load receiving portion 11a. The connecting portion 12a has a substantially rectangular parallelepiped shape elongated in the forward and backward directions, connecting the pump unit 4 with the load receiving portion 11a. The longitudinal direction of the connecting portion 12a and the direction of the rotary shaft R of the fuel pump 41 correspond to each other since both directions extend in the forward and backward directions and are parallel to the forward-backward axis.

The vibrations of the fuel pump 41 may be transmitted upwards and outwards via the connecting portion 12a to the load receiving portion 11a shown in FIGS. 2 and 3. The load receiving portion 11a is made of an elastically deformable member in order to create a dampening effect to reduce the transmission of the vibrations via the load receiving portion 11a to the base portion 5. For example, the load receiving portion 11a may be made of a leaf spring etc. Further, the load receiving portion 11a has a plate shape and supports the pump casing 43 accommodating the fuel pump 41 so that the pump casing 43 is suspended from a substantially central position of the load receiving portion 11a, via connecting portion 12a, in the leftward and rightward directions. Both ends of the load receiving portion 11a are attached to a lateral upper surface of the upper base 51 via the aforementioned tangential flanges of the load receiving portion 11a, and the load receiving portion 11a is arranged to extend across a part of the pump unit 4 along the leftwards-rightwards axis. More specifically, the pump casing 43 of the pump unit 4 is suspended while the pump unit 4 itself is disposed within the tubular portion which is formed by the upper base 51 and the load receiving portion 11a.

Figure 6:
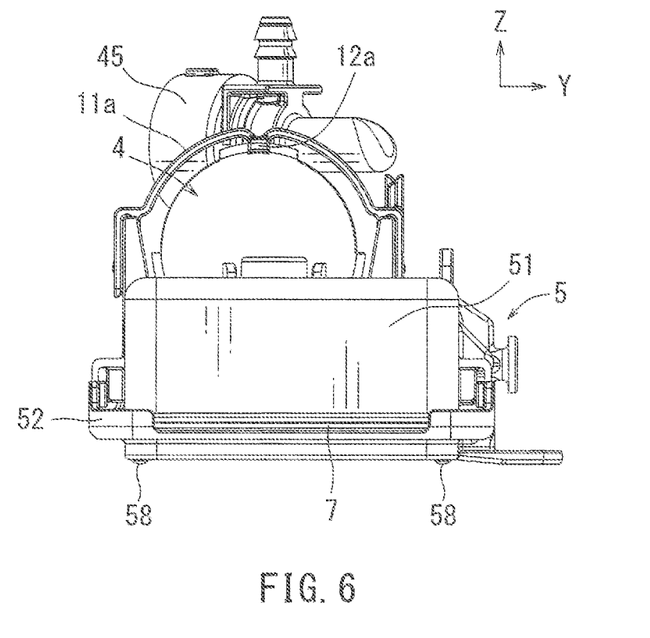
FIG. 6 is a front view of the components shown in FIG. 4 in an assembled configuration.

The pump unit 4 is arranged such that its longitudinal direction extends substantially parallel to a bottom surface of the base portion 5 in a horizontally-placed state as shown in FIGS. 6 and 7. As shown in FIGS. 3 and 12, the fuel pump 41 can deliver the fuel by rotating a rotary body 41a, such as an impeller, while a rotary shaft R of the impeller substantially corresponds to the longitudinal direction of the pump unit 4 so as to be substantially parallel to the bottom surface of the base portion 5. When the rotary body 41a is rotated, the pump unit 4 attempts to move such that the position of the center of gravity G is substantially fixed where both ends of the rotary shaft R rotate about the center of gravity G. Therefore, due to said rotation, the motion of the pump unit 4 will be larger away from the center of gravity G of the pump unit 4 in the direction of the rotary shaft R (farther away from the center of gravity in the forwards and backwards direction). In other words, a position on a virtual plane S (as shown in FIG. 3), where S extends perpendicular to the axis of the rotary shaft R of the fuel pump 41 and passes through the center of gravity G of the pump unit 4, may be provided where the pump unit 4 hardly moves. The connecting portion 12a is then positioned on the virtual surface S at this position. In other words, at least one part of the connecting portion 12a lies in the virtual plane S such that it is located proximate to the center of gravity and experiences relatively little motion.

As shown in FIG. 3, the connecting portion 12a is positioned directly above the center of gravity G of the pump unit 4. Thus, the connecting portion 12a is disposed so as to lie in the virtual plane S which passes through the center of gravity G of the pump unit 4, where the virtual plane S is perpendicular to the rotary shaft R of the rotary body 41a when the fuel pump 41 placed in the pump unit 4 is not operated. Therefore, even when the fuel pump 41 is moved, the connecting portion 12a will experience relatively little motion. More particularly, the connecting portion 12a is arranged on a virtual line extending directly upward from the center of gravity G. The virtual line is positioned to be perpendicular to an abutting surface on which the base portion 5 abuts the tank unit.

As shown in FIG. 2, the pump unit 4 is configured to be suspended. The connecting portion 12a extends above the fuel pump 41. Further, the connecting portion 12a is only present on an upper side of the fuel pump 41 but is not present on a lower side of the fuel pump 41. The connecting portion 12a extending downwardly from the load receiving portion 11a serves to apply force oriented directly upward with respect to stress from the pump unit 4. Therefore, when the pump unit 4 is stationary, tensile stress is mainly applied to the connecting portion 12a. This upward direction of force avoids a situation where large shearing stress is applied to the connecting portion 12a. As a result, the flexibility in configurations etc. of the connecting portion 12a may be increased.

As shown in FIG. 3, a part of the connecting portion 12a is preferably positioned directly above the center of gravity G of the pump unit 4. Further, the center position of the connecting portion 12a in the direction of the rotary shaft R is preferably positioned above the shaft coplanar with virtual plane S.

As shown in FIG. 2, the pump unit 4 may be connected to the load receiving portion 11a via one connecting portion 12a in a preferred embodiment. However, the pump unit 4 may also be connected by a plurality of connecting portions 12a. One connecting portion may be preferred because the number of vibration transmission paths can be reduced if the number of portions, where the load receiving portion 11a is connected to the connecting portion 12a, are reduced.

As shown in FIG. 5, the load receiving portion 11a and the base portion 5 are connected by the connecting structure where a protruding portion 86 of the base portion 5 is inserted into a recessed portion 85 of the pump unit 4. A slight gap is formed between the recessed portion 85 and the protruding portion 86 by the connecting structure, in contrast to a press-fit configuration. Therefore, due to said gap, a slight rattling may be generated between the load receiving portion 11a and the base portion 5 in contrast to a closely contacting state. Thus, due to said gap, the connecting structure can also reduce the vibration transmission from the pump unit 4 and load receiving portion 11a to the base portion 5 as opposed to a greater degree of vibration transmission due to greater contact with a press-fit configuration between recessed portion 85 and protruding portion 86.

As shown in FIG. 5, the protruding portion 86 formed at the base portion 5 is inserted into the recessed portion 85 formed at the load receiving portion 11a of the pump unit 4. In this way, the load receiving portion 11a may be connected to the base portion 5. The projecting portion 86 is formed as a part of a protruding part 83 formed at the base portion 5. As shown in FIG. 4, the protruding parts 83 extend upwardly from a main body of the base portion 5 and are positioned at sides of the pump unit 4. In the pump unit 4, the recessed portions 85 are formed in clamp parts 84 which are the aforementioned tangential flanges of the load receiving portion 11a, positioned at both opposite radial ends of the semicircular arc shape of load receiving portion 11a. Each clamp part 84 is arranged to face each protruding part 83 along the leftwards-rightwards axis. As a result, the interaction of the clamp parts 84 and the protruding parts 83, respectively, may limit the movement of the load receiving portion 11a in the leftward-rightward direction to below a predetermined amount, and prevent the protruding portion 86 from detached from the recessed portion 85 in this direction. The load receiving portion 11a can also be prevented from being separated from the base portion 5 even when the entire periphery of the protruding portion 86 does not closely contact the recessed portion 85 (i.e. there is a clearance space between protruding portion 86 and recessed portion 85 along its periphery) if the movement ranges of the load receiving portion 11a other than in the leftward-rightward direction (i.e. the forwards-backwards and upwards-downwards ranges) are also limited to below a predetermined amount between the recessed portion 85 and the protruding portion 86. Accordingly, the protruding portion 86 can behave within the confines of the recessed portion 85.

As shown in FIGS. 4 and 5, the flexible filter medium 73 may be clamped between the upper base 51 and the lower base 52. This may further prevent the vibration of the fuel tank 9 shown in FIG. 2. Furthermore, since both upper base 51 and filter medium 73 are elastically deformable, this may further prevent the vibration of the fuel tank 9 shown in FIG. 2.

The embodiments of the present disclosure have been described above, however, it is obvious for a person with ordinary skill in the art that various replacements, modifications or changes are possible within the scope in which the subject matter of the present disclosure will not be changed. Therefore, the embodiments of the present disclosure may include all replacements, modifications or changes that does not extend beyond the gist and the object of the claims as attached. For example the embodiments of the present disclosure are not limited to the specific configurations but may be changed as follows.

Figure 8:
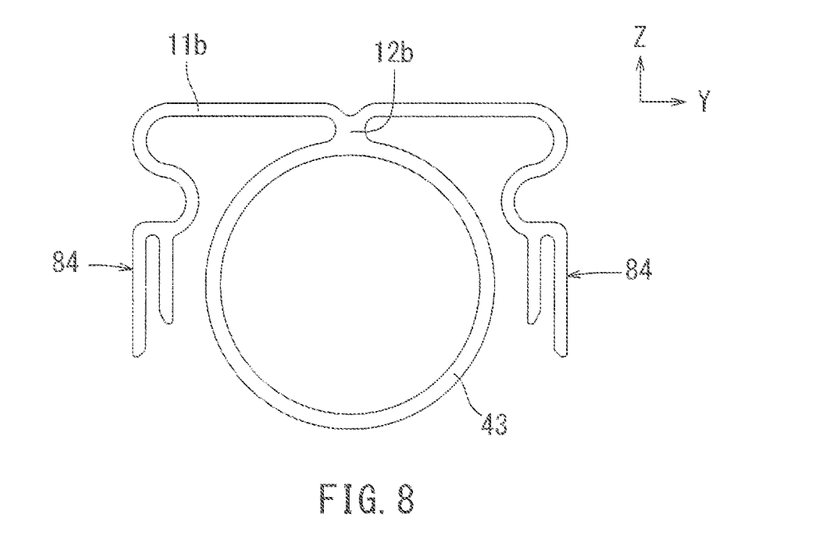
FIG. 8 is a schematic front view of a pump casing according to another embodiment.

The fuel supply device may include a load receiving portion 11b shown in FIG. 8 instead of the load receiving portion 11a shown in FIGS. 1 and 4. The load receiving portion 11b is formed by bending, for example, a plate member, multiple times. In comparison to load receiving portion 11a, the load receiving portion 11b has a bent portion, which is bent e.g. in a substantially S-shape as seen from a side view. This configuration can effectively absorb the vibrations since the length of the elastically deformable load receiving portion 11b can be made relatively long. Further, because it can be elastically deformable due to its shape, the vibrations can also be easily absorbed. The load receiving portion 11b has bent portions on both sides of the connecting portion 12b. Particularly, from a side view, it is configured to be linearly symmetric with a vertical line passing through the connecting portion 12b as a symmetric axis such that a part where the load receiving portion 11b and the connecting portion 12b are connected forms a substantially T-shape. The load receiving portion 11b can be relatively easily deformed in a vertical direction as the bent portion of the load receiving portion 11b is bent so as to be folded in a vertical direction.

Figure 9:
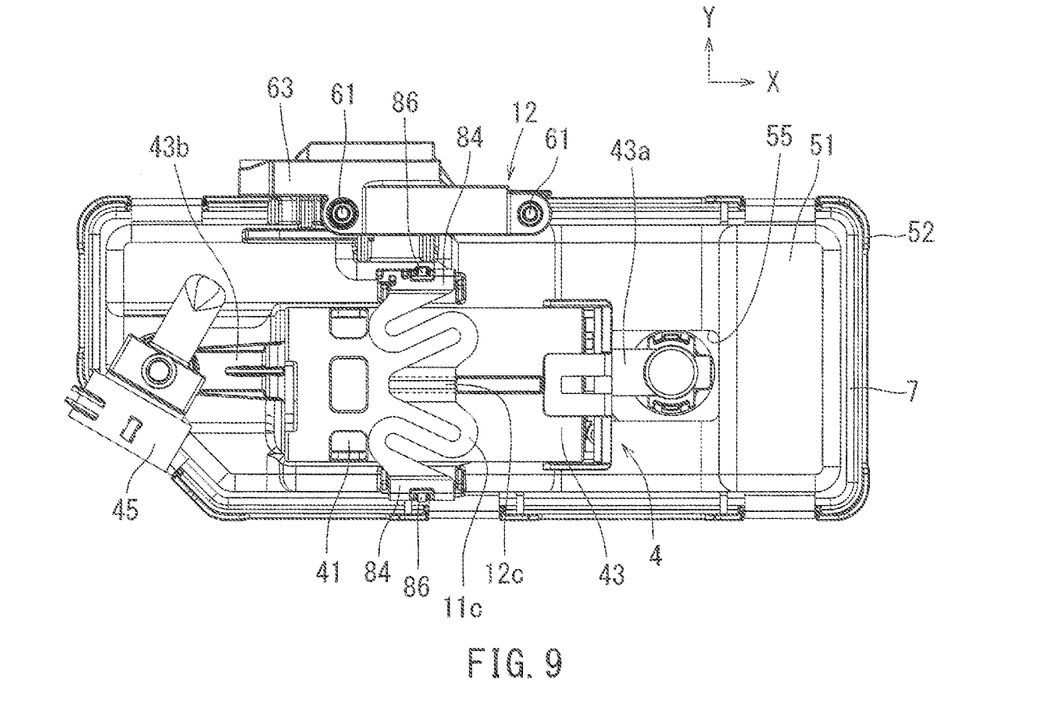
FIG. 9 is a plan view of a load receiving portion of the fuel supply device according to another embodiment.

The fuel supply device may have a load receiving portion 11c shown in FIG. 9 instead of the load receiving portion 11a shown in FIGS. 1 and 4. The load receiving portion 11c includes bent portions, which are bent in leftward and rightward directions. The load receiving portion 11c includes the bent portions on both sides of the connecting portion 12c. Particularly, the load receiving portion 11c includes bent portions being linearly symmetric with a forwards-backwards line passing through the connecting portion 12c as a symmetric axis. The bent portions are bent so as to be capable of being folded in leftward and rightward directions so that the load receiving portion 11c can be relatively easily deformed in the leftward and rightward directions. Moreover, the load receiving portion 11c can be easily deformed also in upward and downward directions because it extends in a circular arc along a surface of the pump unit 4. Further, the load receiving portion 11c is relatively long because it includes the bent portions. Therefore, the load receiving portion 11c may prevent the vibration transmission more effectively while preventing the pump unit 4 from colliding with various parts.

Figure 10:
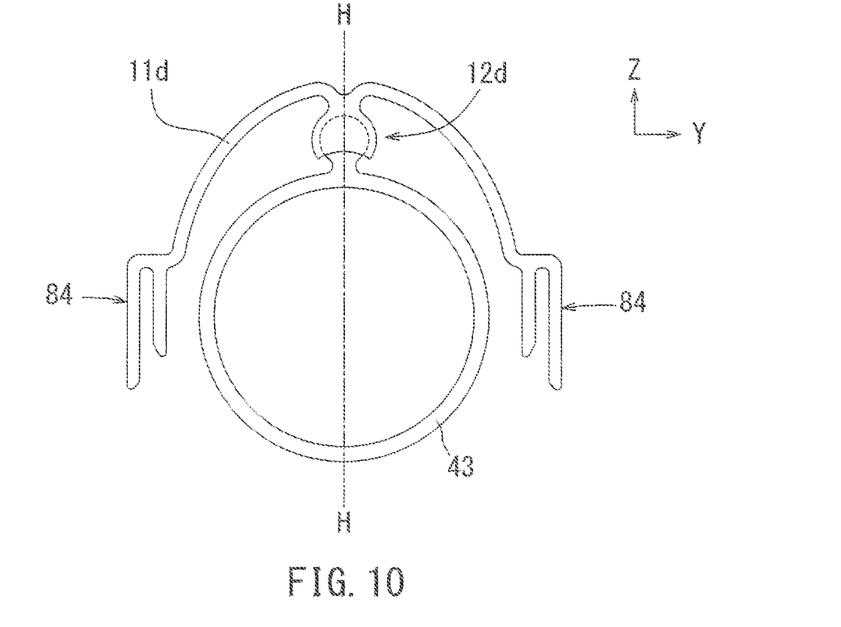
FIG. 10 is a schematic front view of a pump casing according to another embodiment.
Figure 11:
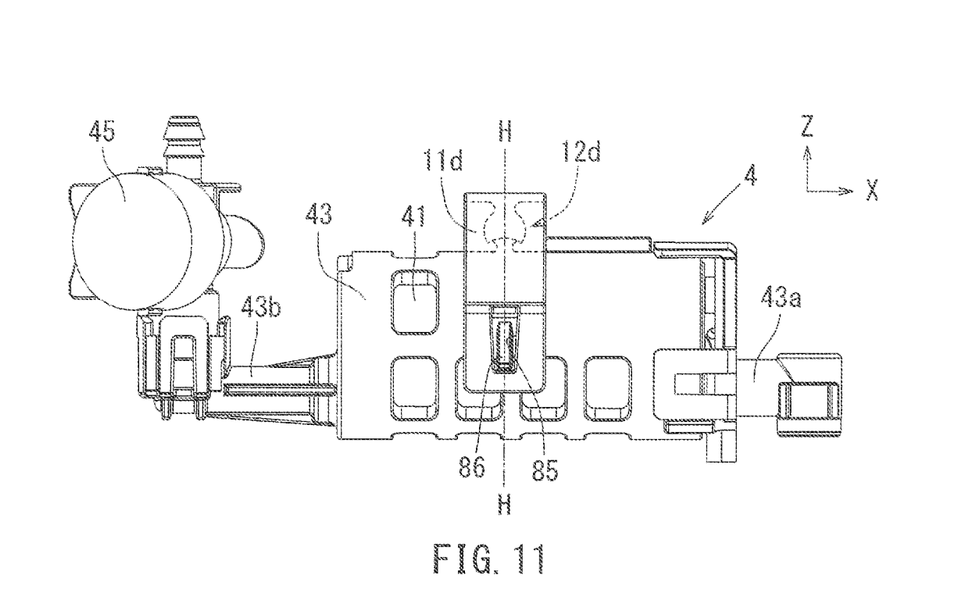
FIG. 11 is a right side view of a pump unit according to another embodiment.

The fuel supply device may have a load receiving portion 11d and a connecting portion 12d shown in FIGS. 10 and 11 instead of the load receiving portion 11a and the connecting portion 12a shown in FIGS. 1 and 4. The load receiving portion 11d includes a fitting portion which fits to the connecting portion 12d. A gap is formed between the fitting portion and the connecting portion 12d, therefore, which may serve to reduce the vibration transmission further from the fuel pump 41 to the load receiving portion 11d. The connecting portion 12d may be configured to be flexible. In particular, the connecting portion 12d may be bent when the pump unit 4 is moved while the fuel pump 41 is driven. This may further prevent the vibration from traveling from the pump unit 4 to the load receiving portion 11d.

As shown in FIGS. 10 and 11, the connecting portion 12d suspends the pump casing 43 at one point so that the pump casing 43 can swing around a central axis H of the connecting portion 12d. For example, the connecting portion may comprise a ball joint with an approximately spherical protrusion 12d while the fitting portion of the load receiving portion 11d has a recess that encloses the connecting portion 12d to be fitted. This configuration may also effectively dampen the vibrations at the connecting portion 12d.

As described-above, the fuel supply device may include only one connecting portion or it may include a plurality of connecting portions. In other words, the pump casing 43 and the load receiving portion may be connected at one place or at a plurality of places. A plurality of connecting portions may be arranged to be aligned in a direction perpendicular to the rotary shaft R shown in FIG. 3 or may be arranged around the rotary axis. Further, at least one or all of a plurality of connecting portions may be arranged on the virtual plane S shown in FIG. 3.

As described-above, the connecting portion may be positioned directly above the center of gravity G of the pump unit. Alternately, it may also be disposed in a position not directly above the center of gravity G. For example, the connecting portion may be disposed in a position in the vicinity of the center of gravity G but slightly displaced from the center of gravity G in the leftward, rightward, forward or backward directions.

The load receiving portion may be formed or configured such that it comprises an elastically deformable material. Alternately, it may also be formed of a non-elastically deformable material, for example, a rigid material. However, the deformable configuration is preferred, as it may prevent the vibrations from traveling from the fuel pump to the fuel tank to a greater degree, etc.

As described-above, the load receiving portion may have both ends fitted into the base portion, and may be connected to the base portion by both of its ends. Alternatively, the load receiving portion may be fixed to the base portion by a screw or screws. As a further alternative, the load receiving portion and the base portion may also be integrally formed.

As described-above, the load receiving portion and the base portion are configured to be separable. Alternatively, the load receiving portion and the base portion may be formed integrally such that they are not separable. The load receiving portion and the base portion may be formed of different materials if they are configured to be separable. For example, the load receiving portion may be formed of an elastic material. Further, the gap described above, that is formed between the load receiving portion and the connecting portion of the base portion may be formed such that the gap has a dampening effect, and prevents vibrations from traveling.

As described-above, the base portion includes the filter medium provided between the upper base and the lower base. Alternatively, the base portion may not include the lower base and/or the filter medium.

As shown in FIG. 5, the connecting structure for connecting the load receiving portion 11a and the base portion 5 includes the recessed portion 85 formed on both ends of the load receiving portion 11a and the protruding portion 86 formed on corresponding protruding parts 83 of the base portion 5. Alternatively, the connecting structure may include a protruding portion formed on the ends of the load receiving portion 11a and the recessed portion formed on the protruding parts 83 of the base portion 5, in which the protruding portion may be inserted. Since the protruding portion of the connecting structure is inserted into the recessed portion with the gap, the protruding portion and the recessed portion can move relatively with each other. Alternatively, the protruding portion may be slidably or rotatably connected to the recessed portion.

Moreover, as a vehicle, application of the invention is not limited to an automobile, but it may be applied to such a vehicle that flies in the air, e.g. an airplane or a helicopter, or that moves over the sea or in the sea, e.g. a ship or a submarine.

The invention claimed is:

1. A fuel supply device comprising:
   a pump unit with a fuel pump that has a rotary body rotating about a rotary shaft;
   a load receiving portion; and
   a connecting portion configured to connect the pump unit to the load receiving portion such that the pump unit is suspended by the load receiving portion,
   wherein the connecting portion extends across a virtual plane which is perpendicular to the rotary shaft for the rotary body of the fuel pump,
   wherein the load receiving portion is configured to receive the load of the pump unit through the connecting portion and to elastically deform to dampen vibrations, and
   wherein the connecting portion extends downward from an uppermost portion of the load receiving portion toward the pump unit.

2. The fuel supply device of claim 1, wherein the load receiving portion has a semi-circular arc shape.

3. The fuel supply device of claim 1, wherein the load receiving portion has an S-shaped portion.

4. The fuel supply device of claim 1, wherein both ends of the load receiving portion engage with a base portion via a connecting structure where a protruding portion is inserted into a recessed portion.

5. The fuel supply device of claim 1, wherein the virtual plane passes through a center of gravity of the pump unit.

6. A fuel supply device comprising:
   a pump unit with a fuel pump that has a rotary body rotating about a rotary shaft;
   a load receiving portion; and
   a connecting portion configured to connect the pump unit to the load receiving portion such that the pump unit is suspended by the load receiving portion,
   wherein the connecting portion extends across a virtual plane which is perpendicular to the rotary shaft for the rotary body of the fuel pump,
   wherein the load receiving portion is configured to receive the load of the pump unit through the connecting portion and to elastically deform to dampen vibrations, and
   wherein the load receiving portion and the connecting portion form a T-shape at a connection between the load receiving portion and the connecting portion, as viewed in a direction parallel to the rotary shaft.

7. The fuel supply device of claim 1, wherein the load receiving portion comprises a pair of arms, wherein each of the pair of arms is engaged to a base portion at a first end and engaged to the connecting portion at a second end,
   wherein the pump unit is suspended above the base portion from the connecting portion by the pair of arms of the load receiving portion, and
   wherein the arms are configured to receive the load of the pump unit through the connecting portion and to elastically deform to dampen vibrations.

8. The fuel supply device of claim 6, wherein the load receiving portion comprises a pair of arms, wherein each of the pair of arms is engaged to a base portion at a first end and engaged to the connecting portion at a second end,
   wherein the pump unit is suspended above the base portion from the connecting portion by the pair of arms of the load receiving portion, and wherein the arms are configured to receive the load of the pump unit through the connecting portion and to elastically deform to dampen vibrations.

\* \* \* \* \*